US012316569B2

(12) United States Patent
Hakola et al.

(10) Patent No.: US 12,316,569 B2
(45) Date of Patent: May 27, 2025

(54) ALLOCATION OF TRACKING REFERENCE SIGNALS

(71) Applicant: NOKIA TECHNOLOGIES OY, Espoo (FI)

(72) Inventors: Sami-Jukka Hakola, Kempele (FI); Karol Schober, Helsinki (FI); Esa Tapani Tiirola, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 16 days.

(21) Appl. No.: 18/027,278

(22) PCT Filed: Sep. 29, 2020

(86) PCT No.: PCT/EP2020/077184
§ 371 (c)(1),
(2) Date: Mar. 20, 2023

(87) PCT Pub. No.: WO2022/069014
PCT Pub. Date: Apr. 7, 2022

(65) Prior Publication Data
US 2023/0336305 A1    Oct. 19, 2023

(51) Int. Cl.
*H04W 72/0446* (2023.01)
*H04L 5/00* (2006.01)
(Continued)

(52) U.S. Cl.
CPC ........... *H04L 5/0051* (2013.01); *H04W 48/08* (2013.01)

(58) Field of Classification Search
CPC ... H04L 5/0051; H04L 5/0032; H04L 5/0091; H04L 5/0023; H04L 5/0048; H04L 5/0082; H04L 27/2613; H04W 48/08
(Continued)

(56) References Cited

U.S. PATENT DOCUMENTS 11,576,142 B2 * 2/2023 Zhang ..................... H04L 1/203
2019/0058517 A1 2/2019 Kang et al.
(Continued)

FOREIGN PATENT DOCUMENTS

CN         111373665 A      7/2020
WO      2019/067925 A1      4/2019
(Continued)

OTHER PUBLICATIONS

First Office Action dated Mar. 28, 2024 corresponding to Chinese Patent Application No. 202080107512.1, with English summary thereof.
(Continued)

*Primary Examiner* — Maharishi V Khirodhar
(74) *Attorney, Agent, or Firm* — SQUIRE PATTON BOGGS (US) LLP

(57) ABSTRACT

There is provided an apparatus comprising at least one processor, and at least one memory including computer program code, the at least one memory and the computer program code configured to, with the at least one processor, cause the apparatus to perform: determining synchronization signal block(s) that have been transmitted in a serving cell; receiving group information of tracking reference signals, the group information comprising an indication on the synchronization signal block(s) for which a tracking reference signal has been configured in the serving cell; receiving mapping information comprising an indication on how individual tracking reference signal is mapped to a slot structure; and determining time domain position(s) of tracking reference signal(s) of the apparatus based on the group information and the mapping information.

15 Claims, 11 Drawing Sheets

(51) Int. Cl.
*H04W 48/08* (2009.01)
*H04W 88/08* (2009.01)

(58) Field of Classification Search
USPC ........................................................ 370/330
See application file for complete search history.

(56) References Cited

U.S. PATENT DOCUMENTS

2020/0136767 A1* 4/2020 Ernström .............. H04L 5/0053
2022/0416972 A1* 12/2022 Li ......................... H04W 72/23

FOREIGN PATENT DOCUMENTS

| WO | 2019/160292 A1 | 8/2019 |
| WO | 2019/225908 A1 | 11/2019 |
| WO | 2020/034889 A1 | 2/2020 |

OTHER PUBLICATIONS

International Search Report and Written Opinion dated Jun. 28, 2021 corresponding to International Patent Application No. PCT/EP2020/077184.
Sony, "On TRS/CSI-RS occasion(s) for idle/inactive UEs," 3GPP Draft R1-2005583, 3GPP TSG RAN WG1 #102e, e-Meeting, Aug. 17-Aug. 28, 2020, Aug. 7, 2020, XP051917563.
Nokia et al., "Initial Access Signals and Channels for NR-U," 3GPP Draft R1-1908686, 3GPP TSG RAN WG1 Meeting #98, Praha, Czech Republic, Aug. 26-30, 2019, Aug. 16, 2019, XP051765294.
Ericsson, "Open issues on RRC parameters for Reference signals and QCL," 3GPP Draft R1-1718683, 3GPP TSG RAN WG1 Meeting 90bis, Prague, Czech Republic, Oct. 9-13, 2017, Oct. 8, 2017, XP051341856.
Communication pursuant to Rules 161(1) and 162 EPC dated May 12, 2023 corresponding to European Patent Application No. 20785938.0.
Communication under Rule 71(3) EPC dated Apr. 26, 2024 corresponding to European Patent Application No. 20785938.0.
Ericsson, "Details on QCL," 3GPP Draft; R1-1718452, 3GPP TSG-RAN WG1 #90bis, Prague, Czech Republic, Oct. 9-13, 2017.
First Examination Report dated Aug. 13, 2024 corresponding to Indian Patent Application No. 202317029901.
Second Office Action dated Sep. 26, 2024 issued in corresponding Chinese Patent Application No. 202080107512.1, with English language machine-translation thereof.
Chinese Office Action issued in corresponding Chinese Application No. 2020801075121 on Jan. 16, 2025.

* cited by examiner

700

|   |   |   |   |   |   |   |   |   |   |   |   |   |   |
|---|---|---|---|---|---|---|---|---|---|---|---|---|---|
| 0 | 1 | 2 | 3 | 0 | 1 | 2 | 3 | 4 | 5 |   |   | 4 | 5 |
| 0 | 1 | 2 | 3 | 0 | 1 | 2 | 3 | 4 | 5 |   |   | 4 | 5 |
| 0 | 1 | 2 | 3 | 0 | 1 | 2 | 3 | 4 | 5 |   |   | 4 | 5 |
| 0 | 1 | 2 | 3 | 0 | 1 | 2 | 3 | 4 | 5 |   |   | 4 | 5 |
| 0 | 1 | 2 | 3 | 0 | 1 | 2 | 3 | 4 | 5 |   |   | 4 | 5 |
| 0 | 1 | 2 | 3 | 0 | 1 | 2 | 3 | 4 | 5 |   |   | 4 | 5 |
| 0 | 1 | 2 | 3 | 0 | 1 | 2 | 3 | 4 | 5 |   |   | 4 | 5 |
|   |   |   |   |   |   |   |   |   |   |   |   |   |   |
| 0 | 1 | 2 | 3 | 4 | 5 | 6 | 7 | 8 | 9 | 10 | 11 | 12 | 13 |

|   |   |   |   |   |   |   |   |   |   |   |   |   |   |
|---|---|---|---|---|---|---|---|---|---|---|---|---|---|
|   | 0 |   | 1 |   | 0 |   | 1 | 2 |   |   |   |   | 2 |
|   | 0 |   | 1 |   | 0 |   | 1 | 2 |   |   |   |   | 2 |
|   | 0 |   | 1 |   | 0 |   | 1 | 2 |   |   |   |   | 2 |
|   | 0 |   | 1 |   | 0 |   | 1 | 2 |   |   |   |   | 2 |
|   | 0 |   | 1 |   | 0 |   | 1 | 2 |   |   |   |   | 2 |
|   | 0 |   | 1 |   | 0 |   | 1 | 2 |   |   |   |   | 2 |
|   | 0 |   | 1 |   | 0 |   | 1 | 2 |   |   |   |   | 2 |
|   |   |   |   |   |   |   |   |   |   |   |   |   |   |
| 0 | 1 | 2 | 3 | 4 | 5 | 6 | 7 | 8 | 9 | 10 | 11 | 12 | 13 |

ALLOCATION OF TRACKING REFERENCE SIGNALS

CROSS-REFERENCE TO RELATED APPLICATION

This application is a national-stage filing under 35 U.S.C. 371(c) of PCT International Patent Application No. PCT/EP2020/077184, filed on Sep. 29, 2020. The disclosure of the prior application is hereby incorporated by reference in its entirety.

FIELD

Various example embodiments relate to allocation of tracking reference signals, e.g. in beam based unlicensed operation.

BACKGROUND

New radio (NR) physical layer channels in Release 15 have been designed to be optimized for frequency ranges below 52.6 GHz. Release 16 aims to enable and optimize 3GPP NR systems for operation in frequency ranges above 52.6 GHz. Currently, 60 GHz millimetre wave (mmWave) unlicensed/licensed band (57-71 GHz) is the available international mobile telecommunications (IMT) band which is above 52.6 GHz. The regulation conditions such as the amount of spectrum available, coexistence scheme, maximum effective isotropic radiated power (EIRP), opportunities for licenced band operation etc. vary according to region. For example, in the EU, frequency bands 57-66 GHz are available for unlicensed band operation while the frequency bands 66-71 GHz are available for both unlicensed band and licensed band operation.

European Telecommunications Standards Institute (ETSI) sets regulations for e.g. transmission power and EIRP for different frequency bands. Due to rather limited EIRP as set out by these regulations, a relatively small number of antenna elements may be used at network nodes. Consequence of a small number of antenna elements is wide antenna radiation patterns, i.e. beams. With wider beams, the likelihood for inter beam interference or collisions increases, and therefore there is a need for fair spectrum sharing channel access mechanism. One such mechanism is listen-before-talk (LBT). However, at mmWaves, LBT may prevent transmission of periodic tracking reference signals (TRSs), which may have negative impact on communication between a user equipment and a network node.

Therefore, there is a need for robust tracking reference signal (TRS) transmission.

SUMMARY

According to some aspects, there is provided the subject-matter of the independent claims. Some example embodiments are defined in the dependent claims. The scope of protection sought for various example embodiments is set out by the independent claims. The example embodiments and features, if any, described in this specification that do not fall under the scope of the independent claims are to be interpreted as examples useful for understanding various example embodiments.

According to a first aspect, there is provided an apparatus comprising at least one processor, and at least one memory including computer program code, the at least one memory and the computer program code configured to, with the at least one processor, cause the apparatus to perform: determining synchronization signal block(s) that have been transmitted in a serving cell; receiving group information of tracking reference signals, the group information comprising an indication on the synchronization signal block(s) for which a tracking reference signal has been configured in the serving cell; receiving mapping information comprising an indication on how individual tracking reference signal is mapped to a slot structure; and determining time domain position(s) of tracking reference signal(s) of the apparatus based on the group information and the mapping information.

According to a second aspect, there is provided an apparatus comprising at least one processor, and at least one memory including computer program code, the at least one memory and the computer program code configured to, with the at least one processor, cause the apparatus to perform: transmitting group information of tracking reference signals, the group information comprising an indication on synchronization signal block(s) for which a tracking reference signal has been configured in a serving cell; transmitting mapping information comprising an indication on how individual tracking reference signal is mapped to a slot structure.

According to a third aspect, there is provided a method, comprising: determining synchronization signal block(s) that have been transmitted in a serving cell; receiving group information of tracking reference signals, the group information comprising an indication on the synchronization signal block(s) for which a tracking reference signal has been configured in the serving cell; receiving mapping information comprising an indication on how individual tracking reference signal is mapped to a slot structure; and determining time domain position(s) of tracking reference signal(s) of the apparatus based on the group information and the mapping information.

According to a fourth aspect, there is provided a method, comprising transmitting group information of tracking reference signals, the group information comprising an indication on synchronization signal block(s) for which a tracking reference signal has been configured in a serving cell; transmitting mapping information comprising an indication on how individual tracking reference signal is mapped to a slot structure.

According to a fifth aspect, there is provided a non-transitory computer readable medium comprising program instructions that, when executed by at least one processor, cause an apparatus to at least to perform the method of at least one of the third aspect and its embodiments or the method of at least one of the fourth aspect and its embodiments.

According to a sixth aspect, there is provided a computer program configured to cause a method in accordance with at least one of the third aspect and its embodiments or at least one of the fourth aspect and its embodiments to be performed

BRIEF DESCRIPTION OF THE DRAWINGS

FIG. 7 shows, by way of example, tracking reference signal mapping onto slot structure when no explicit gap is needed between transmissions of different beams;

FIG. 8 shows, by way of example, TRS mapping onto slot structure when one symbol gap is needed between transmissions of different beams;

DETAILED DESCRIPTION

Figure 1:
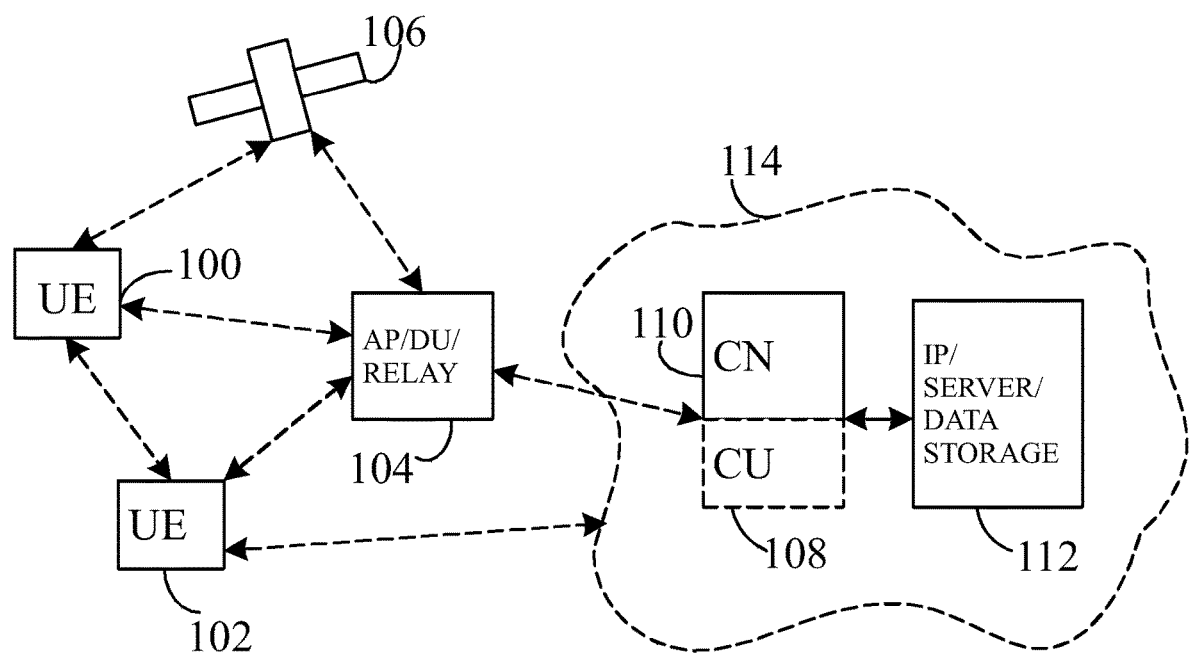
FIG. 1 shows, by way of example, a network architecture of a communication system.

FIG. 1 shows, by way of an example, a network architecture of communication system. In the following, different exemplifying embodiments will be described using, as an example of an access architecture to which the embodiments may be applied, a radio access architecture based on long term evolution advanced (LTE Advanced, LTE-A) or new radio (NR), also known as fifth generation (5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

The example of FIG. 1 shows a part of an exemplifying radio access network. FIG. 1 shows user devices 100 and 102 configured to be in a wireless connection on one or more communication channels in a cell with an access node, such as gNB, i.e. next generation NodeB, or eNB, i.e. evolved NodeB (eNodeB), 104 providing the cell. The physical link from a user device to the network node is called uplink (UL) or reverse link and the physical link from the network node to the user device is called downlink (DL) or forward link. It should be appreciated that network nodes or their functionalities may be implemented by using any node, host, server or access point etc. entity suitable for such a usage. A communications system typically comprises more than one network node in which case the network nodes may also be configured to communicate with one another over links, wired or wireless, designed for the purpose. These links may be used for signalling purposes. The network node is a computing device configured to control the radio resources of the communication system it is coupled to. The network node may also be referred to as a base station (BS), an access point or any other type of interfacing device including a relay station capable of operating in a wireless environment. The network node includes or is coupled to transceivers. From the transceivers of the network node, a connection is provided to an antenna unit that establishes bi-directional radio links to user devices. The antenna unit may comprise a plurality of antennas or antenna elements. The network node is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. An example of the network node configured to operate as a relay station is integrated access and backhaul node (IAB). The distributed unit (DU) part of the IAB node performs BS functionalities of the IAB node, while the backhaul connection is carried out by the mobile termination (MT) part of the IAB node. UE functionalities may be carried out by IAB MT, and BS functionalities may be carried out by IAB DU. Network architecture may comprise a parent node, i.e. IAB donor, which may have wired connection with the CN, and wireless connection with the IAB MT.

The user device, or user equipment UE, typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction.

Additionally, although the apparatuses have been depicted as single entities, different units, processors and/or memory units (not all shown in FIG. 1) may be implemented inside these apparatuses, to enable the functioning thereof.

5G enables using multiple input—multiple output (MIMO) technology at both UE and gNB side, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 7 GHz, cmWave and mmWave, and also being integratable with existing legacy radio access technologies, such as the LTE. Below 7 GHz frequency range may be called as FR1, and above 24 GHz (or more exactly 24-52.6 GHz) as FR2, respectively. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 7 GHz-cmWave, below 7 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud RAN architecture enables RAN real time functions being carried out at the RAN side (in a distributed unit, DU 104) and non-real time functions being carried out in a centralized manner (in a centralized unit, CU 108).

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the constellation may cover several satellite-enabled network entities that create on-ground cells. The on-ground cells may be created through an on-ground relay node 104 or by a gNB located on-ground or in a satellite.

ETSI regulations for transmission (Tx) power and effective isotropic radiated power (EIRP) set for 60 GHz frequency band (57-71 GHz) (mmWave) are as follows: Tx power is set to 27 dBm and EIRP is set to 40 dBm. Due to rather limited EIRP, a relatively small array in terms of number of antenna elements may be used at network node(s), e.g. gNB. Small antenna arrays are cost and power efficient. For example, assuming a CMOS power amplifier (PA) technology, e.g. an 8×4 element array may be used, since the required 40 dBm EIRP may be achieved by low power CMOS when the array size (number of antenna elements) is larger than or equals to 32.

Consequence of such a small or modest array size, in terms of antenna elements, is that the antenna radiation patterns, i.e. beams, are relatively wide. In other words, narrow or pencil beams might not be used. For example, for a uniform linear array (ULA) with 0.5 lambda element spacing, the 3 dB beam width may be approximated by $102°/N$, where N is number of antenna elements per dimension. Thus, for example for 8×4 array, the 3 dB beam widths are around 12.5 and 25 degrees in vertical and horizontal dimensions, respectively.

Figure 2A:
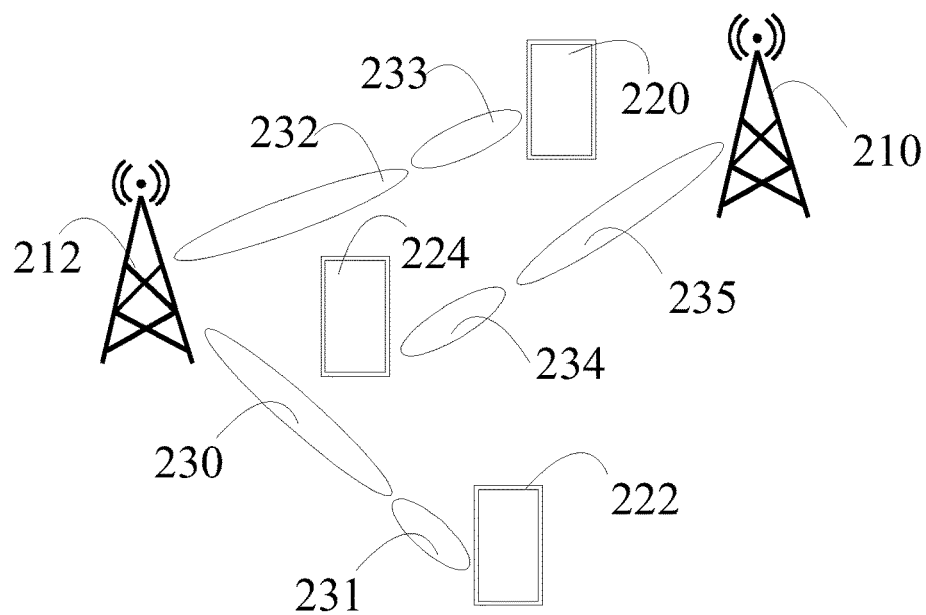
FIG. 2a shows, by way of example, network nodes and user equipments operating with narrow beams.

Systems operating in unlicensed band are typically governed to implement a fair spectrum sharing mechanism, such as listen-before-talk (LBT). LBT is used as the spectrum sharing mechanism especially under 7 GHz carrier frequencies for unlicensed or shared spectrum operation. In unlicensed or shared spectrum operation, the network nodes or access nodes, e.g. gNBs, typically operate with sector wide beams (e.g. by 3 sector antennas arranged in the circle each covering 120 degrees), and the user equipment nodes with omni-directional beams. On the other hand, at mmWaves, where the nodes operate with very narrow beams, there might not be need for LBT type mechanism because the likelihood for collision would be very low. FIG. 2a shows, by way of example, network nodes (or transmit receive points, TRPs) 210, 212 and user equipments (UEs) 220, 222, 224 operating at mmWaves, with very narrow beams 230, 231, 232, 233, 234, 235.

Figure 2B:
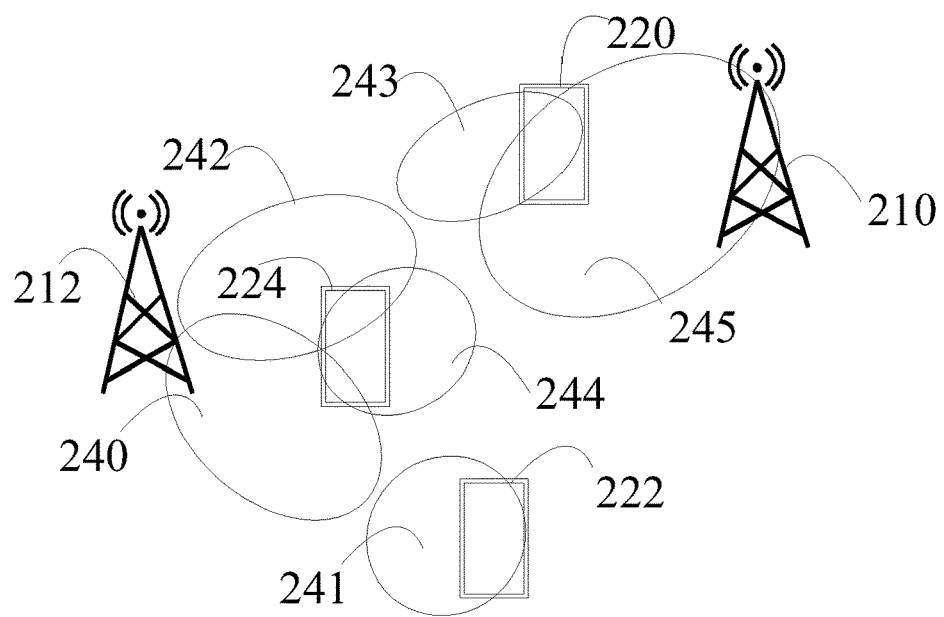
FIG. 2b shows, by way of example, network nodes and user equipments operating with modest beam widths.

However, as discussed above, due to relatively low maximum allowed EIRP as well as due to targeting cost and power efficient transceiver and antenna architectures, relatively small array sizes would be used in practice in unlicensed operation, e.g. at 60 GHz unlicensed operation. FIG. 2b shows, by way of example, network nodes 210, 212 and user equipments 220, 222, 224 operating with beams having modest beam widths 240, 241, 242, 243, 244, 245. Modest beam widths are wider than the narrow beam widths illustrated in FIG. 2a. It may be observed that likelihood for inter-beam interference or collisions would increase. Thus, a need for fair spectrum sharing channel access mechanism arises.

It is considered that LBT type channel access mechanism is to be adopted also for 60 GHz mmWave unlicensed operation, at least in the scenarios where low maximum allowed EIRPs are in use. For example, recommendations by European conference of postal and telecommunications administration (CEPT) for class 1 equipments (indoor access) and class 2 equipments (indoor and outdoor access) allow at maximum 40 dBm EIRP with 23 dBm/MHz PSD (Power Spectral Density).

Beam based operation relies on beam management (BM) procedures that are to setup and maintain one or multiple beam pair links between two radio nodes, such as gNB and UE. Beam pair link refers to a transmit beam at a transmitter and a receive beam at a receiver of a radio link between two radio nodes, such as gNB and UE.

Beam Management (BM) procedures developed in Rel-15 and Rel-16 for frequency range 2 (FR2), which is the carrier frequency range between 24 and 52.6 GHz, are considered to provide a good baseline for NR operation above 52.6 GHz, and thus also for unlicensed operation at 60 GHz. Existing BM procedures, e.g. P-1, P-2 and P-3, provide a set of functionalities for e.g. beam search, beam indication and beam refinement at gNB and UE. P-1 refers to beam selection, wherein gNB sweeps beams and UE selects a best one and reports it to gNB. P-2 refers to beam refinement for transmitter (gNB Tx), wherein gNB refines beams, e.g. sweeping a narrower beam over a narrower range, and UE detects the best one and reports it to gNB. P-3 refers to beam refinement for receiver (UE Rx), wherein gNB fixes a beam, e.g. transmits the same beam repeatedly, and UE refines its receiver beam. In FR2, unlike in FR1, UEs and gNB may be capable of reception/transmission only using one beam at given time.

Figure 3:
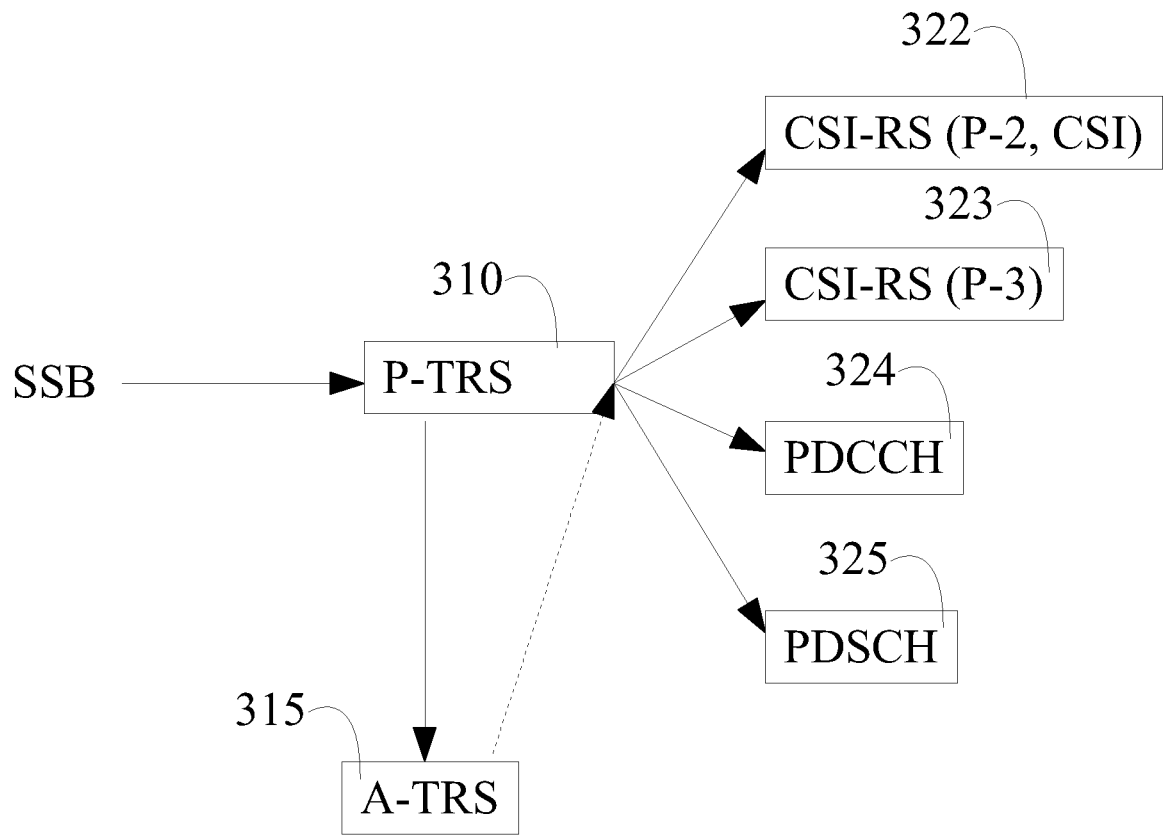
FIG. 3 shows, by way of example, a typical quasi co-location (QCL) configuration for downlink signals and channels.

BM relies heavily on periodic signals, more specifically on periodic tracking reference signals (P-TRS), as quasi co-located (QCL) source for downlink (DL) signals and channels. Furthermore, beam failure detection reference signal(s) (RS) and candidate RS(s) for new beam identification in defined beam failure recovery procedure may be periodic, and typically failure detection RSs are P-TRSs as being active QCL sources for the physical downlink control channel (PDCCH) monitoring in control resource sets (CORESETs). Based on QCL source(s) RS, UE prepares channel estimation filters and sets its reception (Rx) beam for coming signals. Channel estimation filters may comprise e.g. time and frequency domain estimates, e.g. delay spread and/or Doppler spread. The same periodic RSs may typically be used as spatial source for uplink signals and channels, i.e. DL reference signals based on which the UE may form the transmit beam(s) for uplink (UL) transmissions. FIG. 3 shows, by way of example, a typical QCL configuration for the target signals, e.g. downlink signals and channels. The RS, e.g. P-TRS 310, in the start of the arrow represents the source. The signal, e.g. channel state information reference signal (CSI-RS) 322, 323, PDCCH 324 and PDSCH 325, in the end of the arrow represents the target. Aperiodic TRS (A-TRS) 315 may be associated to P-TRS 310, and inherits QCL assumptions from the P-TRS. Both P-TRS and A-TRS may act as source for the target signals 322, 323, 324, 325. A-TRS may be used to densify TRS during times when a UE is served and thus provide better performance. P-TRS may be configured, or needs to be configured, in order to be able to trigger A-TRS. On the other hand, in higher frequencies, significant overhead may be caused if multiple UEs are in connected mode and the A-TRS of each UE is triggered separately.

Considered channel access mechanism, i.e. LBT, may prevent transmission of P-TRS that is the main QCL source for different signals and channels. Therefore, it may be that the UE might not have up to date QCL source for coming signals and/or channels to be received. This may have a negative impact on the DL performance and the UL performance.

There is provided a method, wherein a TRS allocation, e.g. P-TRS allocation, for the user equipment may be floating over time and the allocation at a time depends on the allocation of the TRSs configured upon SSB beams in the cell. Time allocation might not be provided in configuration.

Figure 4:
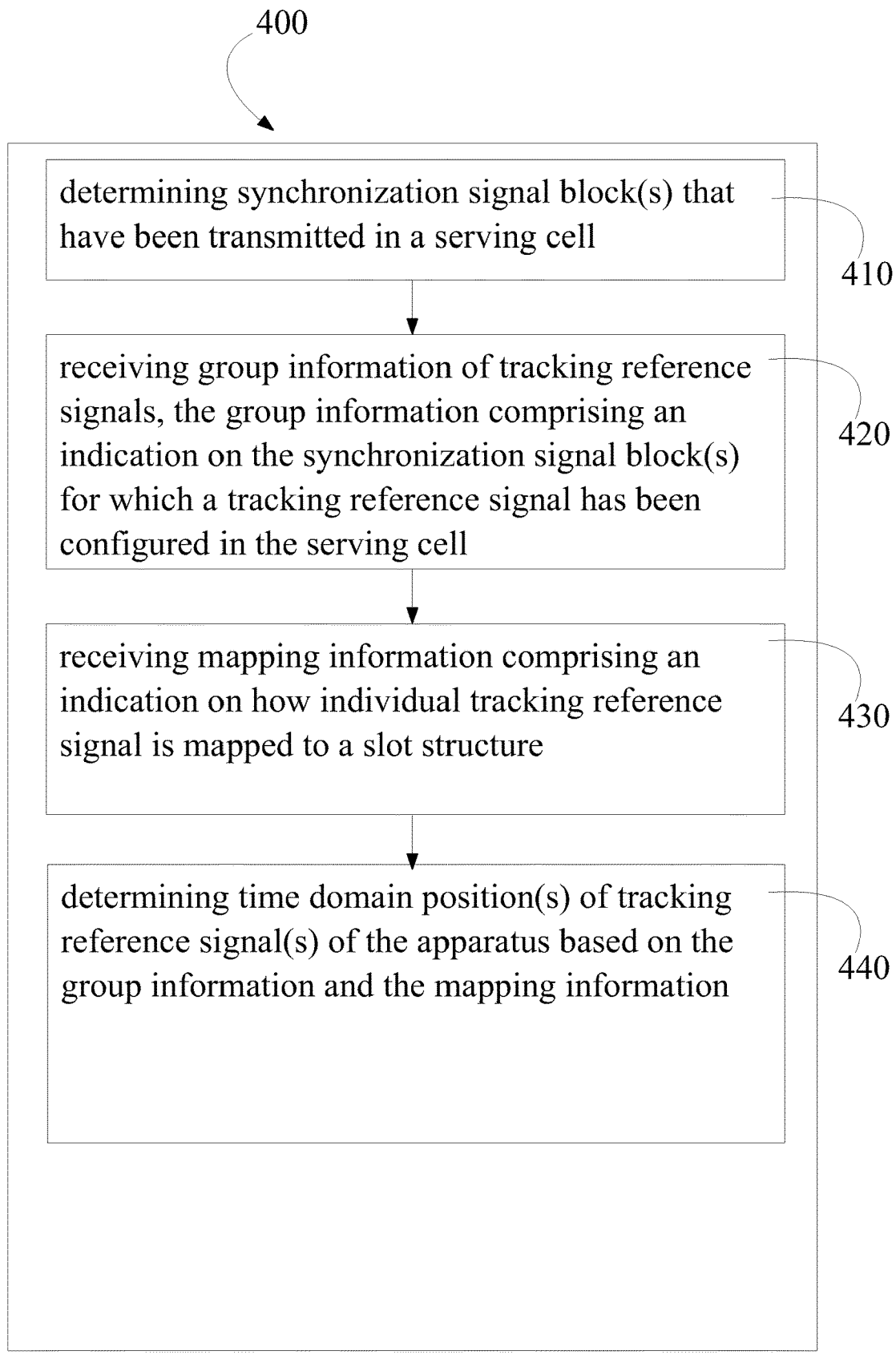
FIG. 4 shows, by way of example, a flowchart of a method.

FIG. 4 shows, by way of example, a flowchart of a method 400 for TRS time allocation. The method 400 may be performed e.g. by device 100 of FIG. 1, which may comprise a user equipment, e.g. a mobile communication device, or in a control device configured to control the functioning thereof when installed therein. The method 400 comprises determining 410 synchronization signal block(s) that have been transmitted in a serving cell. The method 400 comprises receiving 420 group information of tracking reference signals, the group information comprising an indication on the synchronization signal block(s) for which a tracking reference signal has been configured in the serving cell. The method 400 comprises receiving 430 mapping information comprising an indication on how individual tracking reference signal is mapped to a slot structure. The method 400 comprises determining 440 time domain position(s) of tracking reference signal(s) of the apparatus based on the group information and the mapping information.

UE determines transmitted synchronization signal block(s) (SSBs) in a serving cell. For example, the determination may be performed based on remaining minimum system information (RMSI) or based on indication received from the serving cell. The indication may be received via dedicated higher layer signalling, e.g. gNB signalling, and the UE may read the information on the actually transmitted SSBs in the cell (ssb-PositionsInBurst) from the signalling. Alternatively, the UE may determine the actually transmitted SSBs in the serving cell by reading the common higher layer signalling, such as RMSI.

Figure 5:
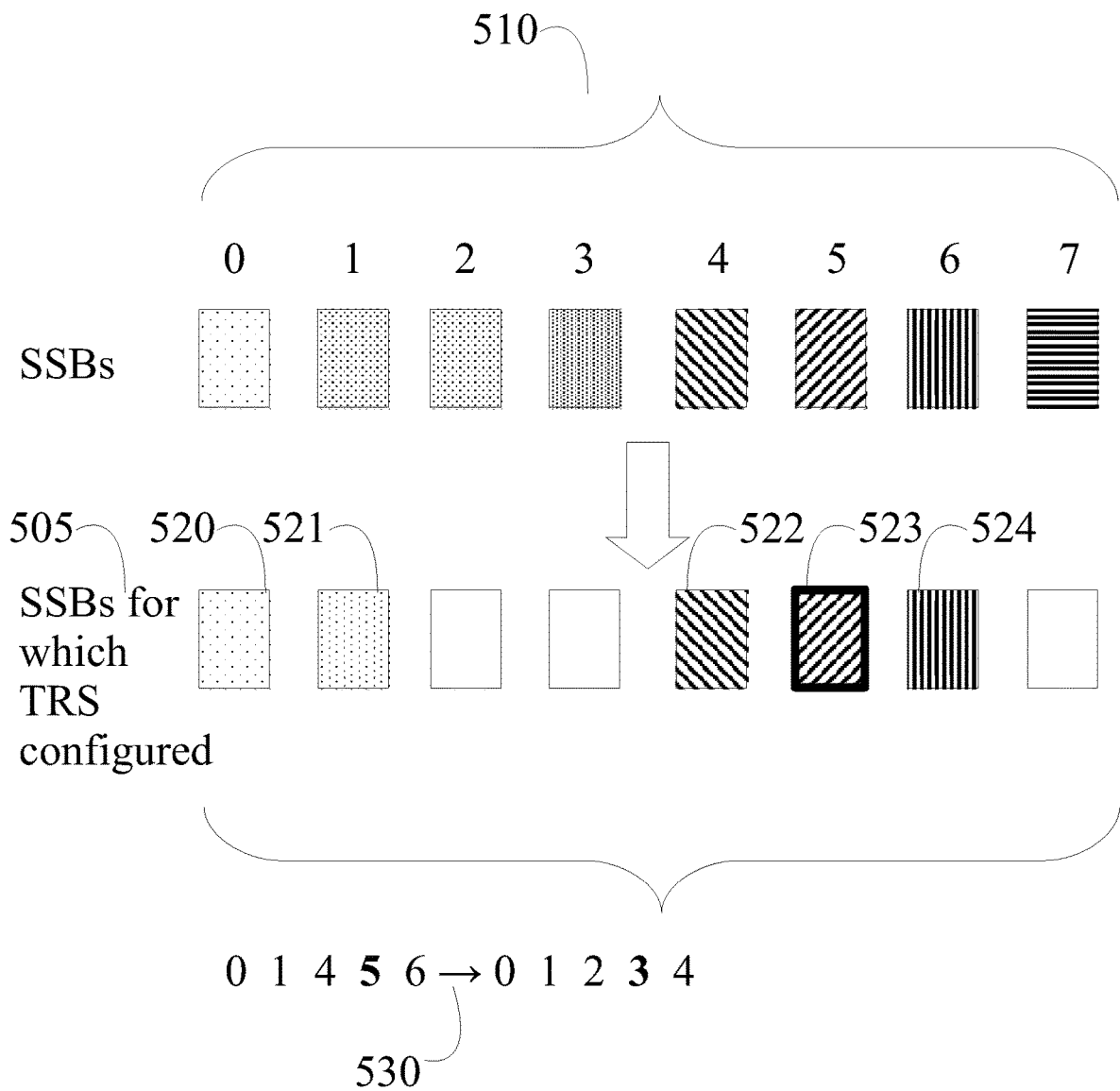
FIG. 5 shows, by way of example, group information of tracking reference signals (TRSs) configured in a serving cell.

The UE receives group information from the network node, e.g. the serving cell. The group information comprises an indication on the synchronization signal block(s) (SSB(s)) for which a tracking reference signal (TRS) has been configured in the serving cell. Indication of the SSBs may be a subset of actually transmitted SSBs for which TRS has been configured in the cell. In other words, group information tells UE that for which SSBs there is TRS configured upon. FIG. 5 shows, by way of example, group information of tracking reference signals configured in a serving cell. SSBs 510 may be assigned a running logical index 0, 1, 2, 3, 4, 5, 6, 7. The bottom row 505 shows the SSBs for which TRS has been configured, which are illustrated as blocks with filling 520, 521, 522, 523, 534. The UE may determine based on the group information that upon which SSBs of the actually transmitted SSBs the gNB transmits TRS in the cell. The UE may transform 530 the SSB indices with transmitted TRS, e.g. 0, 1, 4, 5, 6 to logical indices 0, 1, 2, 3, 4. It may be considered that the UE is "under" SSB #5 523 which corresponds to logical index 3. SSB index in which UE's TRS is configured may be described e.g. by having SSB index as a QCL source for the TRS.

The UE receives mapping information from the network node, e.g. the serving cell. The mapping information comprises an indication on how individual TRS is mapped to a slot structure. In other words, the mapping information indicates to the UE how individual TRS corresponding to a certain logical index is mapped to a slot structure. The mapping information may also indicate how individual TRS is mapped to a sweep/burst structure. The mapping information, or a pre-determined mapping rule, may comprise indication on e.g. one or more of:
- a starting slot (slot offset) for the TRS mapping within a radio frame;
- outer periodicity e.g. in radio frames: a number of TRSs in one slot, or a number of sweeps within a period; alternatively TRS may be configured with outer periodicity in slots together with reference slot subcarrier spacing (SCS).
- mapping pattern, i.e. whether TRSs are mapped on consecutive slots or non-consecutive slots, e.g. every second slot, every third slot, every fourth slot, etc.;
- inner periodicity i.e. a number of mappings within an outer periodicity;
- information on which SSB is as QCL source for TRS.

Figure 6:
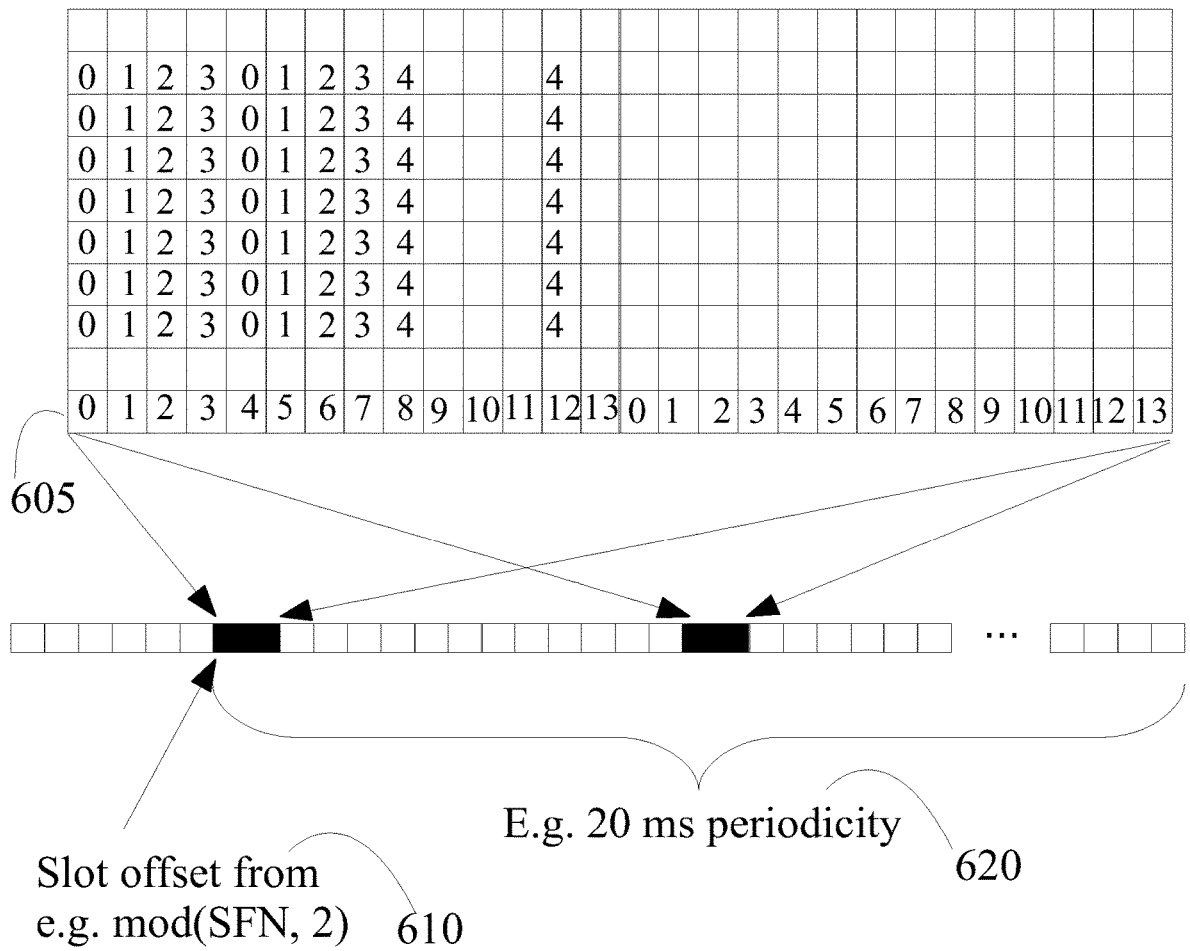
FIG. 6 shows, by way of example, mapping information of indicated TRSs based on group information.

FIG. 6 shows, by way of example, mapping information of indicated TRSs based on group information. Orthogonal frequency-division multiplexing (OFDM) symbols 605 are shown on the bottom row. Logical indices may be transformed to TRS positions e.g. maintaining a structure of 2 symbols which are 4 symbols apart, which is a mapping pattern familiar from Rel-15. In the example of FIG. 6, TRSs for 5 SSBs are shown. Slot offset may be defined 610 e.g. by mod(SFN, outer periodicity), wherein SFN is system frame number, and periodicity in this example is 2, i.e. configurable times in period is 2. Duration of a period 620 in this example is 20 ms.

The UE determines time domain position(s) of its own TRS(s) based on the group information and the mapping information. Calculation of time domain positions for the TRSs may be based on e.g. logical SSB index, slot offset, number of sweeps within a period, and/or TRS mapping pattern. In the following, determination of the time domain positions for TRSs with different configurations is described.

FIG. 7 shows, by way of example, tracking reference signal mapping onto slot structure 700 when no explicit gap is needed between transmissions of different beams. For example, configuration of TRSs may indicate omni-beam LBT and no need for explicit beam switching gap between transmissions of different beams. Let us consider that there are 6 TRSs within a slot.

The UE may calculate a first occasion, or a first time domain position, of the TRS of interest:
  Slot:=slot_offset from starting slot defined by mod(SFN, periodicity)=0+floor(Nth SSB of TRS/6), wherein the mod is modulo operation, SFN is system frame number, periodicity is outer periodicity, and N is SSB index in which UE's TRS is configured.
  Symbol:=0 and 4 for mod(Nth SSB of TRS/6)=0
  Symbol:=1 and 5 for mod(Nth SSB of TRS/6)=0
  Symbol:=2 and 6 for mod(Nth SSB of TRS/6)=0
  Symbol:=3 and 7 for mod(Nth SSB of TRS/6)=0
  Symbol:=8 and 12 for mod(Nth SSB of TRS/6)=0
  Symbol:=9 and 13 for mod(Nth SSB of TRS/6)=0

The UE may calculate Xth occasion, or Xth time domain position, of the TRS if Xth occasion is configured:
  Slot:=slot_offset from starting slot defined by mod(SFN, periodicity)+floor(Nth SSB of TRS/6)+slot_offset_Xth_occ
  Symbol:=0 and 4 for mod(Nth SSB of TRS/6)=0
  Symbol:=1 and 5 for mod(Nth SSB of TRS/6)=0
  Symbol:=2 and 6 for mod(Nth SSB of TRS/6)=0
  Symbol:=3 and 7 for mod(Nth SSB of TRS/6)=0
  Symbol:=8 and 12 for mod(Nth SSB of TRS/6)=0
  Symbol:=9 and 13 for mod(Nth SSB of TRS/6)=0

FIG. 7 illustrates the mapping of the first slot (14 symbols) in the period with different beams presented by different numbers. In this example, one TRS resource comprises two symbols being four symbols apart from each other in time domain. Symbols 705 are shown on the bottom row.

FIG. 8 shows, by way of example, TRS mapping onto slot structure 800 when one symbol gap is needed between transmissions of different beams. For example, configuration of TRSs may indicate directional LBT and need for explicit beam switching gap between transmissions of different beams. It may be assumed that there is room for 3 TRSs within a slot.

The UE may calculate a first occasion, or a first time domain position, of the TRS of interest:
  Slot:=slot_offset from starting slot defined by mod(SFN, periodicity)=0+floor(Nth SSB of TRS/3), wherein the mod is modulo operation, SFN is system frame number, periodicity is outer periodicity, and N is SSB index in which UE's TRS is configured.
  Symbol:=1 and 5 for mod(Nth SSB of TRS/3)=0
  Symbol:=3 and 7 for mod(Nth SSB of TRS/3)=0
  Symbol:=9 and 13 for mod(Nth SSB of TRS/3)=0

The UE may calculate Xth occasion, Xth time domain position, of the TRS if Xth occasion is configured:
  Slot:=slot_offset from starting slot defined by mod(SFN, periodicity)+floor(Nth SSB of TRS/3)+slot_offset_Xth_occ
  Symbol:=1 and 5 for mod(Nth SSB of TRS/3)=0
  Symbol:=3 and 7 for mod(Nth SSB of TRS/3)=0
  Symbol:=9 and 13 for mod(Nth SSB of TRS/3)=0

The FIG. 8 illustrates the mapping of the first slot (14 symbols) in the period with different beams presented by different numbers. In this example, one TRS resource comprises two symbols being four symbols apart from each other in time domain. One symbol time gap is needed due to both beam switching and directional LBT made before intended transmissions, e.g. before each intended transmission. Beam switching gap of one symbol is needed due to directional LBT. Symbols 805 are shown on the bottom row. Beam switching gap of one or more OFDM symbols may be required for sub-carrier spacings for which beam switching is not feasible anymore within a cyclic prefix of the OFDM symbol. In some cases, beam switching may be performed within a cyclic prefix of the OFDM symbol, and a gap of one or more symbols may be needed due to directional LBT.

According to an embodiment, the indication on the all or on actually transmitted SSBs for which TRS has been configured in the serving cell is received by the UE in a paging message, when the UE is in radio resource control (RRC) connected mode. This allows the network, i.e. the serving cell, e.g. gNB, to compactly and flexibly transmit TRS burst for the beams with at least one RRC connected UE. The paging message may be transmitted from the network e.g. on physical downlink shared channel (PDSCH), on a paging downlink control information (DCI) message, or on group common physical downlink control channel (GC-PDCCH) DCI message. In addition, a timestamp may be indicated to the UE, wherein the timestamp indicates when the new information, and new TRS sweep structure, is to be applied. In case of DCI signalling, the DCI payload may be up to 64 bits, which corresponds to the maximum number of SSBs. However, in practice, the DCI payload equals to the number of actually transmitted SSBs in the serving cell, which UE may obtain separately from common (e.g. RMSI) or dedicated higher layer signalling.

The UE may monitor, e.g. regularly, paging, paging DCI or GC-PDCCH DCI for the TRS sweep structure update. The UE may be configured a specific search space set to acquire monitoring parameters, e.g. periodicity, offset, number of monitoring PDCCH candidates, etc. Alternatively, an existing search space set may be used for paging monitoring for the update of the TRS sweep, for example TYPE-2 common search space provided in PDCCH-ConfigCommon.

Figure 9:
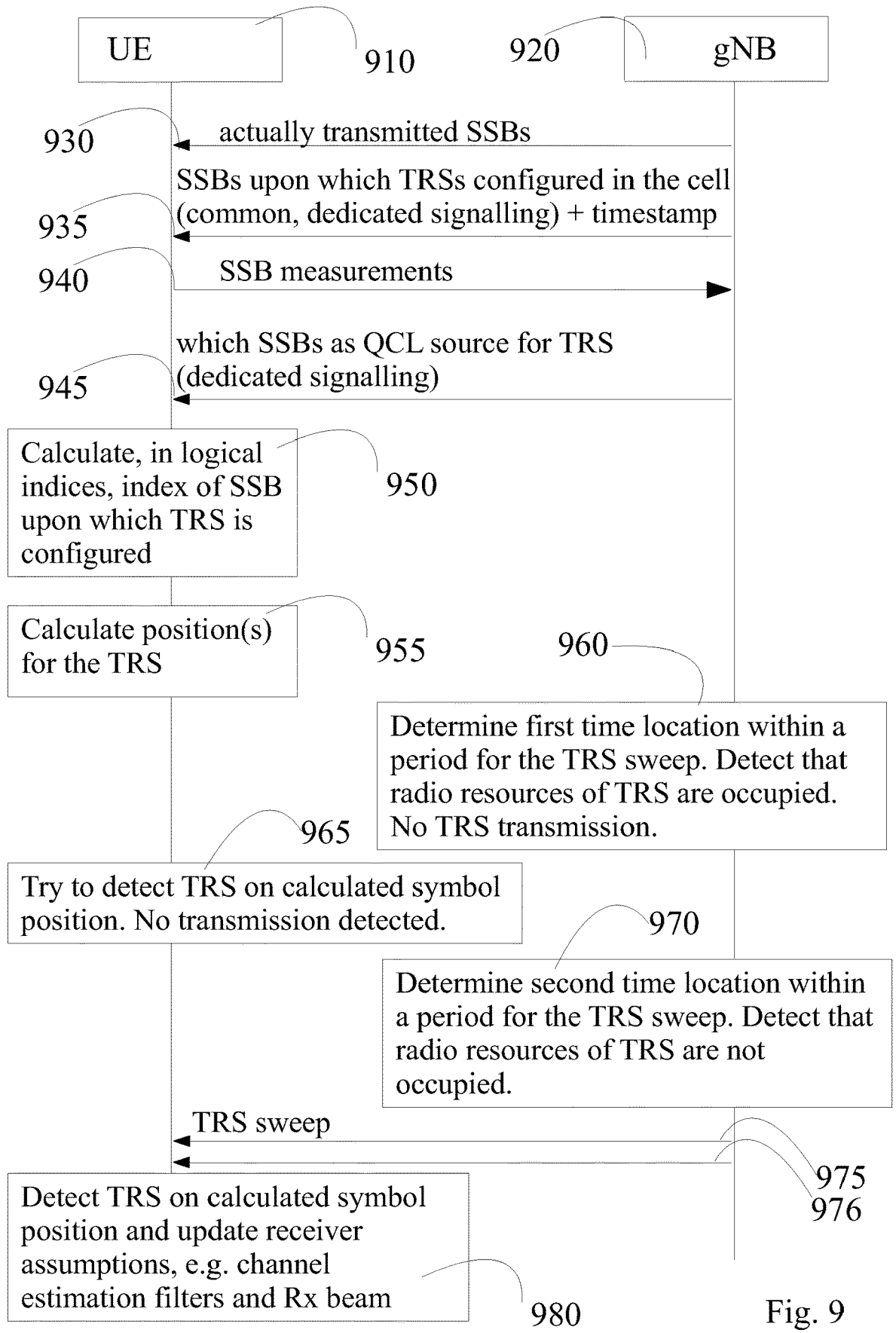
FIG. 9 shows, by way of example, signalling between user equipment and network node.

FIG. 9 shows, by way of example, signalling between user equipment 910 and network node 920, e.g. gNB. Time advances from the top toward the bottom. The gNB may indicate 930 the actually transmitted SSBs in the serving cell, i.e. the gNB. The gNB may transmit this information e.g. periodically. Alternatively, the UE may determine the actually transmitted SSBs based on RMSI. The gNB may transmit 935 group information of TRS. Group information comprises an indication on the SSBs upon which TRSs have been configured in the serving cell. The gNB may determine logical indices for SSBs for which TRS is to be transmitted. The group information may be indicated e.g. in a specific paging message, e.g. DCI message or within PDSCH, which UE reads occasionally, and/or indicated via dedicated signalling. In addition, a timestamp may be indicated to the UE, e.g. along with the group information. The timestamp indicates when the new information, and new TRS sweep structure, is to be applied. For example, first updated TRS burst is the TRS burst which is fully present after the indicated timestamp. Based on UE's beam reporting, or SSB measurements 940, the gNB may transmit 945 mapping information comprising e.g. information on which SSB is as QCL source for TRS.

UE may calculate 950 index of SSBs upon which TRS is configured. Indexing may be based on logical indices. The UE may then determine or calculate 955 time domain positions(s) for the TRS based on e.g. logical SSB index, slot offset, number of sweeps within a period and/or TRS mapping pattern. Additionally, the determination may be based on predefined rule(s) or algorithm(s). The rule(s) or algorithm(s) may be determined by the specification.

The gNB may prepare for transmission of TRS for certain SSB in the location according to the logical index, and construct the TRS sweep(s). The gNB may determine 960 a first time location within a period for the TRS sweep. The gNB may check the occupancy of the radio resources. If it is detected that the radio resources of TRS are occupied, e.g. by transmission of other device, gNB will not transmit TRS. If radio resources are available, gNB transmits TRS via the first time location.

When the time domain positions of the TRSs have been determined, the UE tries 965 to detect the TRSs in the determined time domain positions. Detection of TRS may be two-fold. For example, if the UE detects gNB transmission prior to determined position, the UE may determine that TRS will be transmitted. Otherwise, the UE is trying to detect TRS symbol(s). If the gNB has detected that there are no radio resources available for TRS, the UE does not detect TRS transmission.

Depending on the scenario, i.e. if there were no resources available for the first time location, the gNB may determine 970 a second time location within a period for the TRS sweep. If it detects that the radio resources of TRS are not occupied, the gNB will start the TRS sweep transmission(s) 975, 976. TRS sweep transmissions may form a sweep burst. The gNB might not use the second TRS time location if TRS was transmitted via the first time location within the period for the TRS sweep. If the UE has received the TRS via the first time location, it may assume that the second time location within a period for the TRS sweep is not used.

The UE detects 980, or receives, TRS based on determined allocation, i.e. based on the determined time domain positions(s). The UE may then update e.g. receiver channel estimate filter(s) and/or receive beam (Rx beam) based on the detected, or received, TRSs. The detected, or received, TRS may also facilitate updating the time and/or frequency synchronization processes at the UE.

The gNB may detect, e.g. based on SSB measurements from the UE, that there is a need for QCL source (SSB) for the UE. If a new QCL source, i.e. SSB, for TRS is among the ones for which there is TRS in the cell, the gNB may transmit medium access control-control element (MAC-CE) command to update QCL source for the UE. Then, UE may determine which TRS to detect, i.e. determine the time domain position of TRS.

If the new QCL source is not among the ones for which there is TRS in the cell, the gNB may signal the system frame number (SFN) for the UEs when new TRS sweep structure is in use. The gNB may transmit MAC-CE command to update QCL source for the UE. In that case, gNB may change QCL source and update the TRS burst by a single MAC-CE. On the other hand, via proactive behavior of updating the list of SSB for which TRS is transmitted, the gNB may avoid this situation and additional delay for beam switch for the UE may be avoided.

According to an embodiment, the UE may validate TRS, or TRS sweep transmission(s), based on the detected TRS(s) and the determined time domain position(s). For example, in case there is no on-going downlink transmission from gNB prior the start of the TRS sweep structure, the UE may use one or more TRS time domain positions to detect and validate whether a TRS sweep is transmitted. The UE may be under two SSB beams upon which TRS is configured and then the UE may use TRS locations corresponding to both SSBs to detect and validate TRS sweep transmission. Validation according to this embodiment may be referred to as blind detection.

According to an embodiment, the UE may validate TRS, or TRS sweep transmission(s), as follows: UE detects downlink transmission from the gNB on-going with the indication of the end of the channel occupancy time (COT) either overlapping at least partly the TRS sweep time domain allocation or being later than the end of the TRS sweep structure.

According to an embodiment, the UE may validate TRS, or TRS sweep transmission(s), based on other known signal transmitted with TRS in the symbol(s). Transmission of signals may be based on e.g. frequency division multiplexing or time division multiplexing (FDM/TDM) (back to back). The other known signal, which may be used as a validation signal, may be a cyclic redundancy check (CRC) protected PDCCH. For example, GC-PDCCH carrying information on which SSBs there will be TRS configured upon, may be used as a validation signal. For this purpose, a special TRS-CORESET with TRS search space (SS) with one monitoring occasion and one PDCCH candidate per SSB within the TRS sweep burst may be defined. Valid UL grant allowing transmission of PUSCH or PUCCH within the gNB acquired COT, after a valid TRS location, may also be considered as a validation mechanism for the TRS location. In some embodiments which may be applicable for the case of omni-directional LBT, the PDCCH sweep may precede the TRS burst. A UE, by detecting a PDCCH within that PDCCH sweep, considers whole TRS burst valid.

Figure 10:
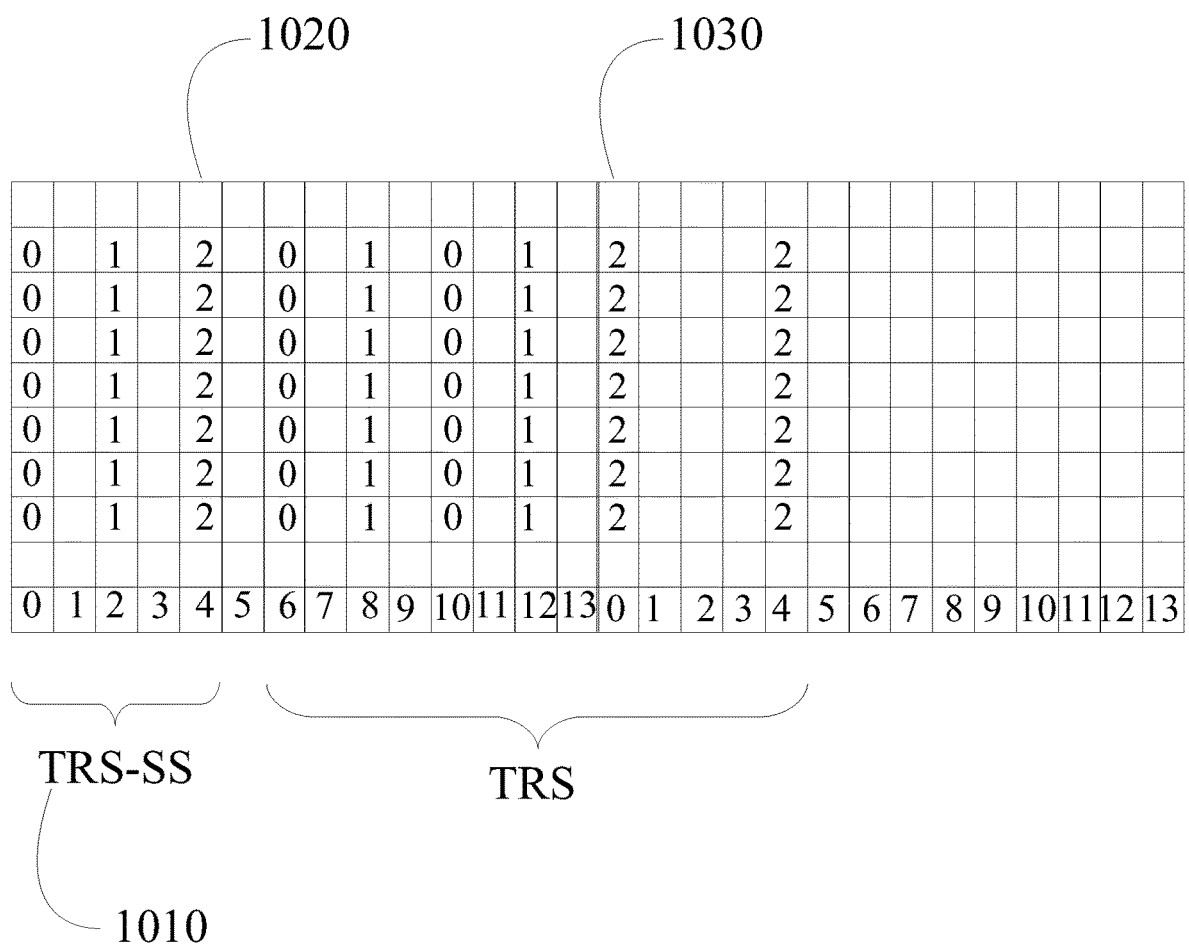
FIG. 10 shows, by way of example, tracking reference signal with validation search space.

FIG. 10 shows, by way of example, tracking reference signal with validation search space 1010, which may be defined, e.g. implicitly, within the TRS sweep burst. The monitoring locations of transmitted TRS are followed by corresponding TRS. UE may be monitoring with active transmissions configuration indication state (TCI-state). UE may receive GC-PDCCH in symbol 4 ($5^{th}$ symbol) 1020, and may determine that i=2. UE may determine the number of beams transmitted (N) from content of GC-PDCCH. In this example, the N is 3. UE may compute the starting location of TRS i as symbol $2*N+[i/2]*8+(i \mod 2)*2$. In the example of FIG. 10, starting location for beam i=2 would be symbol 14 1030, i.e. symbol 0 of the second slot.

Validation of TRS by UE may be more efficient than validation by the gNB.

Figure 11:
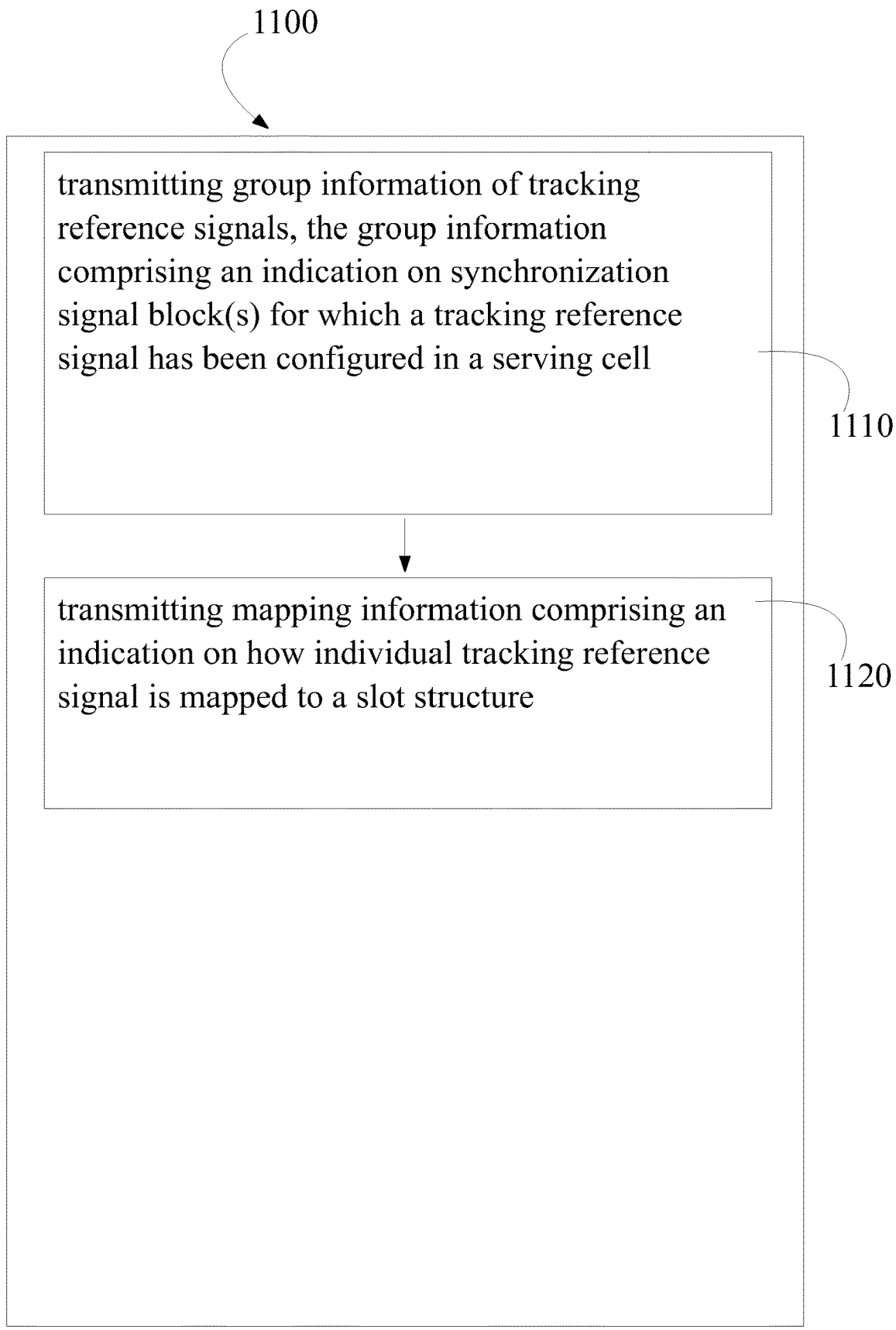
FIG. 11 shows, by way of example, a flowchart of a method.

FIG. 11 is a flow chart of a method 1100 for TRS time allocation. The method 1100 may be performed e.g. by device 104 of FIG. 1, which may comprise a network node, e.g. gNB, or in a control device configured to control the functioning thereof when installed therein. The method 1100 comprises transmitting 1110 group information of tracking reference signals, the group information comprising an indication on synchronization signal block(s) for which a tracking reference signal has been configured in a serving cell. The method 1100 comprises transmitting 1120 mapping information comprising an indication on how individual tracking reference signal is mapped to a slot structure.

The methods as disclosed herein provide robustness for the TRS transmission in beam based system using LBT, e.g. NR unlicensed at 60 GHz. TRS is the main QCL source in the system. The methods as disclosed herein allow handling TRS transmission, e.g. P-TRS transmissions, in an efficient way. The methods as disclosed herein allow UE to autonomously track correct P-TRS in the sweep including beam switching based on UE's QCL source for the P-TRS.

Figure 12:
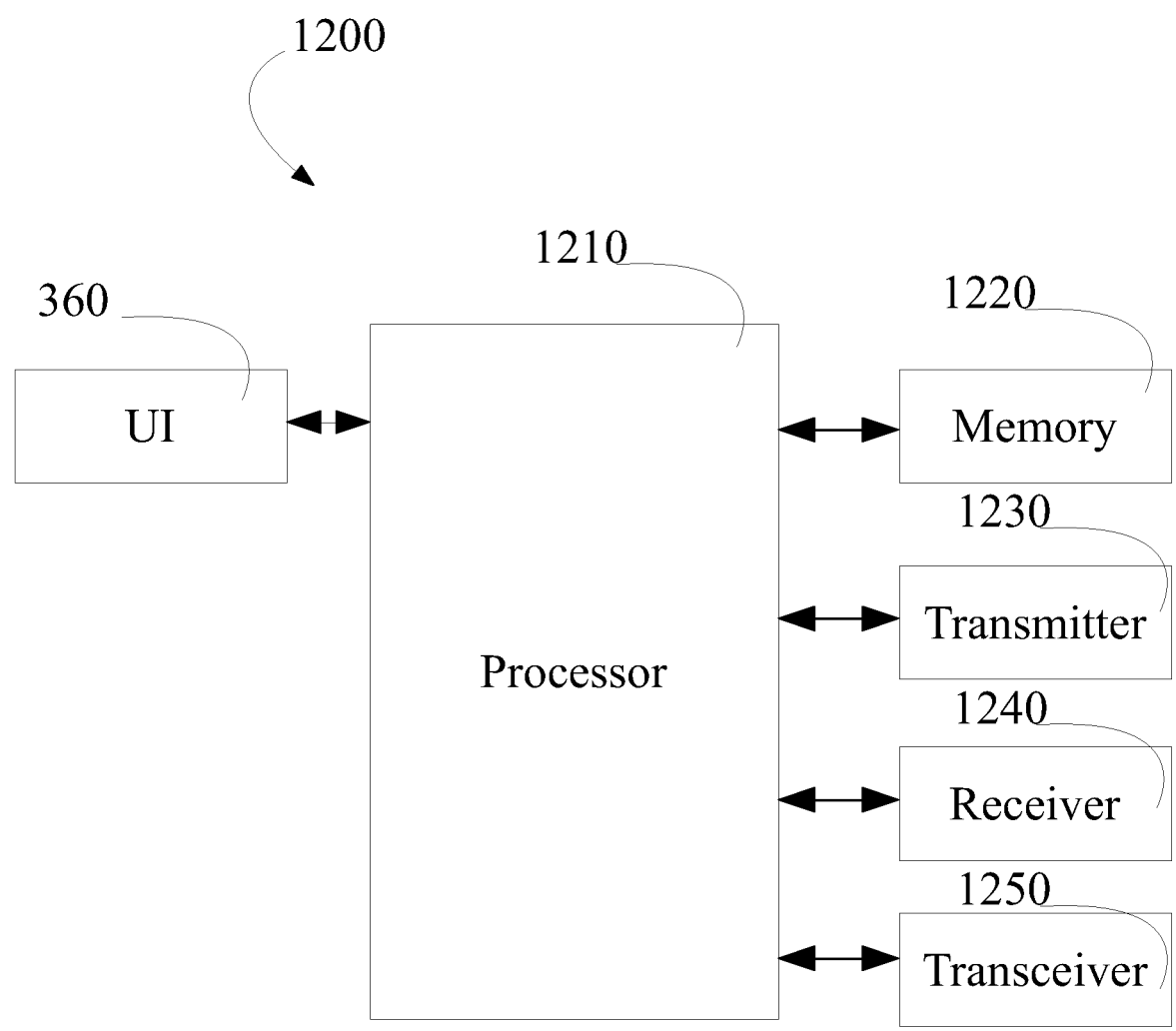
FIG. 12 shows, by way of example, a block diagram of an apparatus.

FIG. 12 shows, by way of example, an apparatus capable of performing the methods as discloses herein. Illustrated is device 1200, which may comprise or may be comprised in, for example, a mobile communication device such as mobile 100 of FIG. 1, or the network node, e.g. access node 104 of FIG. 1. Comprised in device 1200 is processor 1210, which may comprise, for example, a single- or multi-core processor wherein a single-core processor comprises one processing core and a multi-core processor comprises more than one processing core. Processor 1210 may comprise, in general, a control device. Processor 1210 may comprise more than one processor. Processor 1210 may be a control device. A processing core may comprise, for example, a Cortex-A8 processing core manufactured by ARM Holdings or a Steamroller processing core designed by Advanced Micro Devices Corporation. Processor 1210 may comprise at least one Qualcomm Snapdragon and/or Intel Atom processor. Processor 1210 may comprise at least one application-specific integrated circuit, ASIC. Processor 1210 may comprise at least one field-programmable gate array, FPGA. Processor 1210 may be means for performing method steps in device 1200. Processor 1210 may be configured, at least in part by computer instructions, to perform actions.

A processor may comprise circuitry, or be constituted as circuitry or circuitries, the circuitry or circuitries being configured to perform phases of methods in accordance with example embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 1200 may comprise memory 1220. Memory 1220 may comprise random-access memory and/or permanent memory. Memory 1220 may comprise at least one RAM chip. Memory 1220 may comprise solid-state, magnetic, optical and/or holographic memory, for example. Memory 1220 may be at least in part accessible to processor 1210. Memory 1220 may be at least in part comprised in processor 1210. Memory 1220 may be means for storing information. Memory 1220 may comprise computer instructions that processor 1210 is configured to execute. When computer instructions configured to cause processor 1210 to perform certain actions are stored in memory 1220, and device 1200 overall is configured to run under the direction of processor 1210 using computer instructions from memory 1220, processor 1210 and/or its at least one processing core may be considered to be configured to perform said certain actions. Memory 1220 may be at least in part external to device 1200 but accessible to device 1200.

Device 1200 may comprise a transmitter 1230. Device 1200 may comprise a receiver 1240. Transmitter 1230 and receiver 1240 may be configured to transmit and receive, respectively, information in accordance with at least one cellular or non-cellular standard. Transmitter 1230 may comprise more than one transmitter. Receiver 1240 may comprise more than one receiver. Transmitter 1230 and/or receiver 1240 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 1200 may comprise a near-field communication, NFC, transceiver 1250. NFC transceiver 1250 may support at least one NFC technology, such as NFC, Bluetooth, Wibree or similar technologies.

Device 1200 may comprise user interface, UI, 1260. UI 1260 may comprise at least one of a display, a keyboard, a touchscreen, a vibrator arranged to signal to a user by causing device 1200 to vibrate, a speaker and a microphone. A user may be able to operate device 1200 via UI 1260, for example to accept incoming telephone calls, to originate telephone calls or video calls, to browse the Internet, to manage digital files stored in memory 1220 or on a cloud accessible via transmitter 1230 and receiver 1240, or via NFC transceiver 1250, and/or to play games.

Processor 1210 may be furnished with a transmitter arranged to output information from processor 1210, via electrical leads internal to device 1200, to other devices comprised in device 1200. Such a transmitter may comprise a serial bus transmitter arranged to, for example, output information via at least one electrical lead to memory 1220 for storage therein. Alternatively to a serial bus, the transmitter may comprise a parallel bus transmitter. Likewise processor 1210 may comprise a receiver arranged to receive information in processor 1210, via electrical leads internal to device 1200, from other devices comprised in device 1200. Such a receiver may comprise a serial bus receiver arranged to, for example, receive information via at least one electrical lead from receiver 1240 for processing in processor 1210. Alternatively to a serial bus, the receiver may comprise a parallel bus receiver.

Processor 1210, memory 1220, transmitter 1230, receiver 1240, NFC transceiver 1250 and/or UI 1260 may be interconnected by electrical leads internal to device 1200 in a multitude of different ways. For example, each of the aforementioned devices may be separately connected to a master bus internal to device 1200, to allow for the devices to exchange information. However, as the skilled person will appreciate, this is only one example and depending on the embodiment various ways of interconnecting at least two of the aforementioned devices may be selected.

The invention claimed is:
1. An apparatus, comprising:
  at least one processor; and
  at least one memory including computer program code,
    the at least one memory and the computer program code configured to, with the at least one processor, cause the apparatus to perform:

determining synchronization signal block(s) that have been transmitted in a serving cell;
receiving group information of tracking reference signals, the group information comprising an indication on those determined synchronization signal block(s) for which a tracking reference signal has been configured in the serving cell, wherein the indication on those determined synchronization signal block(s) for which a tracking reference signal has been configured comprises a synchronization signal block index;
receiving mapping information comprising an indication on how individual tracking reference signal of the tracking reference signals is mapped to a slot structure; and
determining time domain position(s) of tracking reference signal(s) for the apparatus based on the group information and the mapping information.

2. The apparatus of claim 1, wherein the at least one memory and computer program code, with the at least one processor, further cause the apparatus to perform:
detecting tracking reference signal(s) in the determined time domain position(s).

3. The apparatus of claim 2, wherein the at least one memory and computer program code, with the at least one processor, further cause the apparatus to perform validating tracking reference signal(s) in response to detecting downlink transmission from the serving cell with an indication of an end of a channel occupancy time which
overlaps at least partly with the time domain position determined for the tracking reference signal sweep transmission; or
is later than the end of tracking reference signal sweep structure.

4. The apparatus of claim 1, wherein determining transmitted synchronization signal block(s) in the serving cell is performed based on
remaining minimum system information; or
indication received from the serving cell.

5. An apparatus, comprising:
at least one processor; and
at least one memory including computer program code, the at least one memory and the computer program code configured to, with the at least one processor, cause the apparatus to perform:
transmitting group information of tracking reference signals, the group information comprising an indication on those synchronization signal block(s) for which a tracking reference signal has been configured in a serving cell, wherein the indication on those determined synchronization signal block(s) for which a tracking reference signal has been configured comprises a synchronization signal block index; and
transmitting mapping information comprising an indication on how individual tracking reference signal of the tracking reference signals is mapped to a slot structure.

6. The apparatus of claim 5, wherein the at least one memory and computer program code, with the at least one processor, further cause the apparatus to perform transmitting an indication on transmitted synchronization signal block(s) in the serving cell.

7. The apparatus of claim 5, wherein the at least one memory and computer program code, with the at least one processor, further cause the apparatus to perform:
transmitting tracking reference signal(s) for synchronization signal block(s) for which tracking reference signal has been configured.

8. The apparatus of claim 5, wherein the at least one memory and computer program code, with the at least one processor, further cause the apparatus to perform:
receiving synchronization signal block measurements from a user equipment;
determining a need for quasi co-location source based on the received synchronization signal block measurements; and
transmitting a command to update quasi co-location source for the user equipment.

9. A method, comprising:
determining synchronization signal block(s) that have been transmitted in a serving cell;
receiving group information of tracking reference signals, the group information comprising an indication on those determined synchronization signal block(s) for which a tracking reference signal has been configured in the serving cell, wherein the indication on those determined synchronization signal block(s) for which a tracking reference signal has been configured comprises a synchronization signal block index;
receiving mapping information comprising an indication on how individual tracking reference signal of the tracking reference signals is mapped to a slot structure; and
determining time domain position(s) of tracking reference signal(s) for the apparatus based on the group information and the mapping information.

10. The method of claim 9, further comprising:
detecting tracking reference signal(s) in the determined time domain position(s).

11. The method of claim 10, further comprising:
validating tracking reference signal(s) in response to detecting downlink transmission from the serving cell with an indication of an end of a channel occupancy time which
overlaps at least partly with the time domain position determined for the tracking reference signal sweep transmission; or
is later than the end of tracking reference signal sweep structure.

12. The method of claim 9, wherein determining transmitted synchronization signal block(s) in the serving cell is performed based on
remaining minimum system information; or
indication received from the serving cell.

13. A method, comprising:
transmitting group information of tracking reference signals, the group information comprising an indication on those synchronization signal block(s) for which a tracking reference signal has been configured in a serving cell, wherein the indication on those determined synchronization signal block(s) for which a tracking reference signal has been configured comprises a synchronization signal block index; and
transmitting mapping information comprising an indication on how individual tracking reference signal of the tracking reference signals is mapped to a slot structure.

14. The method of claim 13, further comprising:
transmitting an indication on transmitted synchronization signal block(s) in the serving cell.

15. The method of claim 13, further comprising:
receiving synchronization signal block measurements from a user equipment;

determining a need for quasi co-location source based on the received synchronization signal block measurements;

transmit a command to update quasi co-location source for the user equipment.

* * * * *